April 3, 1962 R. C. WRIGHTFIELD 3,027,629
APPARATUS FOR SECURING RUBBER-LIKE WEATHER STRIPPING
Original Filed March 21, 1955 2 Sheets-Sheet 1
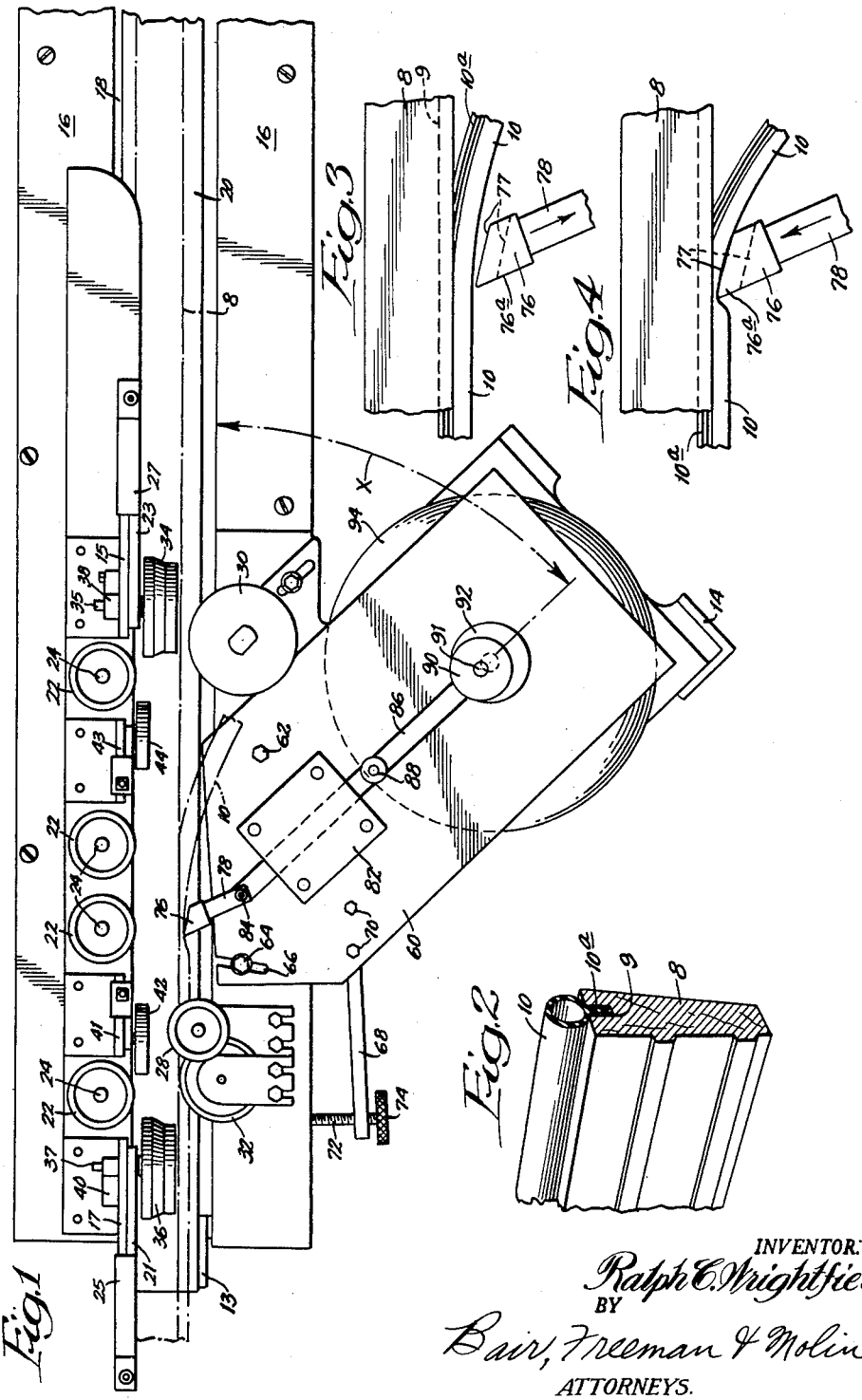
INVENTOR.
Ralph C. Wrightfield,
BY
Bair, Freeman & Molinare
ATTORNEYS.

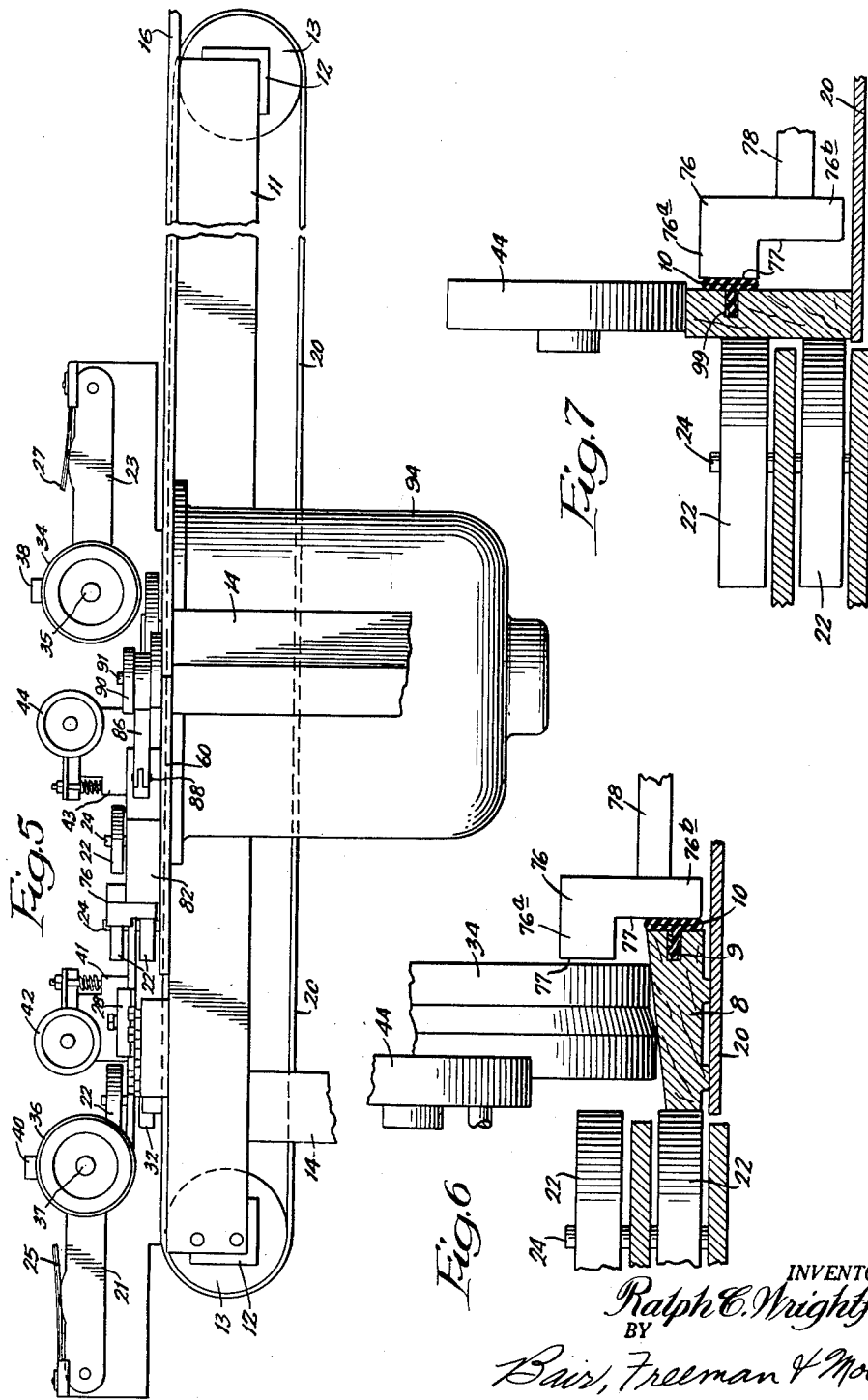

United States Patent Office 3,027,629
Patented Apr. 3, 1962

3,027,629
APPARATUS FOR SECURING RUBBER-LIKE
WEATHER STRIPPING
Ralph C. Wrightfield, Clinton, Iowa, assignor to Curtis
 Companies Incorporated, Clinton, Iowa, a corporation
 of Iowa
Original application Mar. 21, 1955, Ser. No. 495,411, now
 Patent No. 2,924,007, dated Feb. 9, 1960. Divided
 and this application Jan. 26, 1959, Ser. No. 788,980
11 Claims. (Cl. 29—235)

This invention relates to an apparatus for securing flexible rubber-like weather stripping to door and window stops or similar parts which require a seal with a cooperating movable member, like a door or window. It is a division of my application Serial No. 495,411, filed March 21, 1955, now Patent No. 2,924,007, issued February 9, 1960.

Previously, weather stripping for windows and doors has been made from a strip of resilient metal, such as bronze, of V-shaped cross section. A flange extending outwardly from one of the legs of the V was adapted to be pressed into a groove in the stop or jamb member cooperating with the window or door to secure the weather stripping thereto. Metal stripping was usually forced into the groove by means of a press having a pressing bar extending the length of the stripping, or by a roller which applied pressure to a small area of the stripping progressively as the groove-bearing stock and stripping were advanced together past the roller.

Extruded plastic weather stripping in the form of tubing became available in recent years and provides many advantages over conventional metal stripping. It makes a superior seal because of its resilient rubber-like qualities. Any imperfections, like depressions or bumps, in the plane surface of the door or window frame bearing against the stripping are closed off because of the ability of the stripping to conform accurately, even to sharply changing contours. The life of plastic stripping, particularly that made from plasticized polyvinyl chloride resins, is much superior to that of metal stripping, which takes permanent deformation and in a short time fails to provide a tight seal against the mating part. The very properties that make the plastic stripping outstanding from the performance standpoint, namely, its softness and resilience, prevent it from being used in production weatherstripping operations in mills because it is so difficult to install. The stretchy plastic tubular extrusion is provided with an outwardly-extending flange having a cross section resembling a coupled of aligned arrow heads, one behind the other, pointing away from the tube. This flange is adapted to slide into a cooperating groove in the stock and anchor the tubular stripping securely in place. The conventional press adapted to apply pressure along the entire length of the metal stripping was a total failure insofar as application of plastic stripping was concerned because there was no practical way to hold the flexible rubbery material erect with the flange aligned with the groove. Furthermore, as force was applied to the tubular portion of the flimsy stripping, the stripping compressed and turned over without transmitting force to the flange.

The roller apparatus was capable of forcing the flange of the extrusion into the cooperating groove once it was started, but the progressive continuous pressure squeezed the stretchy plastic stripping, causing it to elongate a considerable distance beyond the end of the groove. If the strip was cut shorter than the groove so that the two would match in length after roller installation, it was found that the plastic material gradually recovered to its original length, leaving a segment at either or both ends of the stock devoid of stripping.

It is, therefore, one object of this invention to provide an apparatus for satisfactorily installing plastic stretchy stripping of the kind described within a groove in a cooperating part without substantially changing its length.

Another object is to provide an efficient apparatus for seating stretchy plastic stripping in a cooperating groove rapidly and securely on a production basis.

These and other objects and advantages of the invention will appear from the following description when read in conjunction with the accompanying drawings, in which:

FIGURE 1 is a plan view of a machine constructed in accordance with the invention;

FIGURE 2 is a perspective view of a section of wooden window stop having the tubular plastic stripping secured thereto;

FIGURE 3 is a plan view of a piece of stop and stripping therefor showing the hammer of the apparatus retracting from a blow against the stripping;

FIGURE 4 is a view similar to that of FIGURE 3 with the hammer in full forward position;

FIGURE 5 is an elevational view of the apparatus shown in FIGURE 1;

FIGURE 6 is a cross-sectional fragmentary view illustrating the means for holding a length of window stop in the machine during the installation of the stripping; and FIGURE 7 is a view similar to FIGURE 6 showing a different sized piece of stock having the stripping secured to the side thereof.

I have found that by striking the stripping progressively at longitudinally spaced points as the groove-bearing stock and stripping are advanced past a reciprocating striking means, the stripping can be anchored firmly in the groove. The intermittent instantaneous pressure imposed by the striking means apparently permits the stripping to recover between strokes so that a large amount of the objectionable stretching is eliminated. The end of the stripping must, of course, be started by manual insertion of the flange in the groove. I have further found that all of the stretching can be eliminated by striking the stripping at an acute angle in the direction the groove-bearing stock and stripping are advancing. If the striking force is applied normal to the groove some stretching will occur, although it is not nearly so severe as that which takes place through the use of a roller, for example. It is also desirable to provide the striking means with a blunt vertical edge for contacting the stripping as distinguished from a flat surface having a considerably larger area. Other important features of this invention will be pointed out as the description proceeds.

Referring now to FIGURE 2, which illustrates the final product, window stop 8 contains a groove 9 extending longitudinally in the upper surface thereof in which the stripping 10 is secured. The window stop may be made from wood or other rigid material. It will be noted that the stripping is tubular in shape and has an outwardly-extending flange 10a having a cross-sectional configuration resembling a pair of aligned arrow heads pointing away from the tube. The total width of the flange is greater than the width of the groove, for example, about .025 inch greater than a ⅛ inch groove. The configuration of the flange 10a permits the flange to be inserted in the groove 9 with a minimum of pressure, while a comparatively large force is required to remove the stripping from the groove due to the fact that in removing the stripping the outer points of the arrow heads must be turned over, which turning or inversion offers considerable resistance. Obviously, other flange configurations may be employed which permit easy insertion and difficult removal.

A machine constructed in accordance with my invention for inserting plastic stripping 10 within the groove 9 of window stop 8, or other suitable stock containing a cooperating longitudinal groove, is shown in FIGURES 1 and 5. The frame of the machine consists of horzontal angle iron members 11 supported by upright frame members or legs 14. Mounted between the laterally spaced parallel frame members 11 are pillow blocks 12, one at either end of the machine for journalling shafts and rollers 13 over which a flexible conveyor belt 20 is trained. The frame of the machine supports top plate or table 16, which has a recess 18 therein adapted to receive the belt 20 so that the top surface thereof is flush with the top surface of the plate 16 on either side of the belt. The belt is driven by a suitable power source (not shown). Preferably, a conventional variable speed drive or other suitable means is inserted between the power source and the belt 20 so that the speed at which the belt travels can be adjusted.

In order to guide the stock in which weather stripping is being installed through the apparatus, I have provided a series of rollers 22 which are free to rotate on vertical shafts 24 extending upwardly from the plate 16 and secured thereto at their lower ends. The shafts and rollers are aligned on the far side of the belt, as viewed in FIGURE 1, to support one side of the stock. It will be noted that the guide rollers 22 are mounted in pairs at different heights above the belt 20 so that they will accommodate stocks of different thicknesses or heights. Short or flat lengths of stock will bear against the lower rollers while the thicker or higher lengths of stock will bear against both the lower and upper rollers together. In addition to the horizontally mounted rollers 22 on the far side of the machine, I have provided three horizontal rollers 28, 30 and 32 on the opposite side of the belt 20 for preventing the stock from moving laterally. Rollers 28, 30 and 32 are adjustable laterally, as shown in FIGURE 1, to permit varying the space between the circumferences thereof and the stationary rollers 22 in accordance with the width of the stock being worked on.

To keep the stock in firm contact with the moving belt so that it will advance at the same rate of speed as the belt, hold-down rollers 34 and 36 are vertically mounted on shafts 35 and 37 journalled in uprights 38 and 40 secured to vertical plates 15, 17 bolted to the plate 16 at their lower flanged ends. The uprights have open-ended slots at different heights into which the shafts may be slipped. Pivotally mounted arms 21, 23, biased downwardly by leaf springs 25, 27, are adapted to hold the shafts 37 and 35 in the open-ended slots (not shown). The faces of rollers 34 and 36 are bevelled to complement the cross-sectional configuration of the stock against which they bear. Additional elevated hold-down rollers 42 and 44 are similarly mounted on vertical plates 41 and 43 intermediate rollers 34 and 36 and serve to hold down relatively high stock being processed on the machine. The rollers 42 and 44 are resiliently mounted in adjustable uprights so that they may be raised or lowered to take care of different sized stocks. Any suitable means may be employed for providing vertical adjustment for the hold-down rollers and it is not deemed necessary to describe such means in detail.

A hammer for striking the stripping and anchoring the flange securely in the groove of the stock is mounted on a plate 60 which is bolted to the plate 16 on the frame of the machine and extends laterally from the conveyor. Central upright frame member 14 slidably supports the outer end of the plate. Plate 60 is adapted to pivot about the pin or bolt 62 and may be held securely in any desired position by tightening the bolt 64 disposed within the slot 66 cut in the inner edge of the plate 60. In order to move the plate about the pivot point 62 to adjust the angle X made with the belt, a bracket 68 extends outwardly from the underside of the plate 60 and is bolted thereto by means of bolts 70 which are screwed into tapped holes in the upper face of the bracket 68. Threadedly-engaged with the outer end of the bracket 68 is a screw 72 having a knurled hand wheel 74 secured to the end thereof. The opposite end of screw 72 is rotatably coupled to the side of the frame of the machine.

The hammer has a head 76 extending from an arm 78 which is pivotally secured to the end of a rod 80 adapted to reciprocate within the bearing block 82 bolted to the plate 60. The head 76 has an upper projection portion 76a and a lower recessed portion 76b, both of which are cut angularly to provide a vertical striking edge 77, as best shown in FIGURES 3 and 6. The double head is employed to accommodate grooves in stocks of varying thickness located at different heights above the belt. The arm 78 is secured to the end of the rod 80 by means of a bolt 84 which may be loosened or tightened to permit adjustment of the angle of the hammer with respect to the material which is being processed. The rod 80 extends completely through the bearing and pivotally connects to an arm 86 at point 88. The opposite end of the arm 86 is pivotally connected to a disc 90 which is eccentrically coupled by pin 91 to disc 92 which is fixed to the end of the shaft of a motor 94. The rod 80, by reason of the linkage recited, is adapted to reciprocate upon rotation of disc 90.

It is important that the shaft 80 which carries the hammer arm 78 be mounted at an acute angle X with respect to the longitudinal axis of the groove in which the weather stripping is being inserted. The angle X may be adjusted by pivoting plate 60 about bolt 62 so that the axis of the bearing 82 is adjusted with respect to the angle of advance of the stripping. Furthermore, the force of the hammer must be directed in the direction the belt 20 and the stock thereon is moving. If the hammer strikes against the stripping at right angles to the groove, I have found that the stripping will elongate to a point where it extends beyond the end of the groove. This is probably due to the fact that the stock is moving relatively rapidly through the apparatus and causes drag or friction between the hammer and the plastic stripping which the angular stroke tends to neutralize. The angle X between the reciprocating shaft 80 and the axis of the advancing stock is not particularly critical but generally should be less than 90° and greater than 15°. If the angle is less than 15°, the stripping is not effectively seated in the groove. The preferred angle, as indicated in the drawing, is about 50°. The adjustment of the angle of the arm 78 is not critical but is desirable to be able to modify the angle to regulate the area of hammer face which strikes the stripping. It also permits regulating the distance between the hammer and the edge of the stock. The angle of the force which seats the stripping is, of course, determined by adjustment of the reciprocating rod 80 with respect to the axis of the groove in the advancing stock.

In operation, a piece of stock, such as the stop 8 shown in FIGURE 2, is fed into the machine with the very end of the stripping 10 inserted in the groove even with the end thereof. The free end of the stripping lies over the plate 60. The moving belt advances the stop 8 which is held securely between the upper hold-down rollers 36 and 34 and the belt to prevent any vertical movement. The side rollers 22 on one side and the opposed rollers 30 and 32 on the other side prevent any lateral movement. The reciprocating hammer 76 repeatedly strikes the tubular portion of the stripping 10 as it advances with the stock, to pound the flange 10a into the groove. A frequency of 900 blows per minute has been found to give excellent results with the belt traveling at approximately 30 feet per minute. The hammer 76 is adjusted so that at its maximum point of throw it clears the edge of the stock in the machine by about $\frac{1}{32}$ of an inch. Thus, adequate pressure is insured for seating the flange of the stripping well into the groove, without deforming the stock or cutting the stripping. FIGURE 4 illustrates the hammer pushing the stripping down into the groove as indicated. In FIGURE 3 the hammer is retracting from the position of FIGURE 4 and is about ready to begin its next stroke.

As the stock advances through the machine, the stripping is progressively pounded into the groove until the entire length has been seated. Roller 28 or 32, depending upon the height of the groove above the belt, serves to insure complete seating of the flange by compressing the stripping after it has passed the reciprocating hammer. These rollers also prevent lateral movement of the length of stock, as previously indicated. The belt 20 discharges the assembled piece into a suitable container or onto a conveyor, as desired. Lengths of grooved stock with the end of the stripping started in the groove may be fed into the machine one after the other. At the rate of 30 feet per minute, a considerable amount of material can be processed in a very short time. If desired, the speed of the belt may be further increased. At a belt speed of 30 feet per minute and a frequency of 900 strokes per minute the hammer will strike the stripping at points spaced about 5/16 inch apart. Operation under these conditions provides a very satisfactory job. The spacing of the blows may be regulated by adjusting either the speed of the belt or the speed of the disc 92, which drives the rod 80.

It will be noted from FIGURES 3 and 4 that the hammer 76 terminates in a rather blunt edge 76a which strikes the stripping. It is preferred that an edge rather than the total face of the hammer contact the stripping because I have found that if the contact area is very large, the stretchy plastic material is elongated. The hammer, mounted on arm 78, is adjustable, however, so that any amount of area may be brought into contact with the stripping when the hammer is in operation. Care must be taken that the edge 76a is not sharp enough to cut the plastic stripping. It should also be pointed out that the hammer 76 must be made of a hard material, preferably steel or other suitable metal. Rubber-headed hammers were employed, but they were found to be inferior because they deformed too readily.

In FIGURE 6 I have shown a piece of wood stop 8 in process which has its stripping-receiving groove in the narrow side thereof. The stop lies flat on belt 20 and is held in close contact therewith by roller 34. The outer side (opposite the hammer) contacts the lower rollers 22. The stripping is struck by the lower recessed portion 76b of head 76 with which it aligns. In FIGURE 7 I have illustrated a piece of rectangular stop 97 having a groove 99 in the bottom thereof. Stock of this kind lies with its narrow side on the belt, thus exposing the groove to the upper projecting portion 76a of hammer 76. The stripping is compressed under the blunt edge 77 of the hammer at the end of the stroke, as shown in FIGURE 7. The adjustable hold-down roller 44 urges the stock 97 into close contact with the moving belt 20. From these illustrations it is apparent that the machine may be adapted for a wide variety of stock sizes.

Although I have shown and described specific forms of my invention, those skilled in the art will appreciate that various arrangements of the cooperating elements and substitutions therefor can be made without departing from the true spirit thereof. It is, therefore, my intention not to limit the invention other than as indicated in the appended claims.

What I claim as new and desire to secure by Letters Patent of the United States is:

1. An apparatus for securing flanged flexible rubber-like weather stripping to a groove-bearing member, the stripping having one end of the flange thereon seated in the groove, comprising a frame, conveyor means supported by said frame for advancing the groove-bearing member along a path parallel to the groove, a reciprocatable hammer mounted on said frame adjacent said conveyor means at an acute angle to said groove in the direction of advance, and power means for reciprocating said hammer to cause it to repeatedly strike the stripping, thereby seating the flange in the groove.

2. The apparatus of claim 1 in which the hammer terminates in an edge disposed at 90° to the axis of the groove.

3. The apparatus of claim 1 in which the hammer is mounted on a support which is adjustable to change the size of said acute angle.

4. An apparatus for securing flanged flexible rubber-like weather stripping to a groove-bearing member, the stripping having one end of the flange thereon seated in the groove, comprising a frame, conveyor means supported by said frame for advancing the groove-bearing member along a path parallel to the groove, a reciprocatable hammer mounted on said frame adjacent said conveyor means at an angle to said groove in the direction of advance, power means for reciprocating said hammer to cause it to repeatedly strike the stripping, thereby seating the flange in the groove, and means mounted on said frame at a point longitudinally spaced from said hammer toward the discharge end of said conveyor for bearing against the stripping to insure complete seating of the flange.

5. An apparatus for securing flanged flexible rubber-like weather stripping to a groove-bearing member, the stripping having one end of the flange thereon seated in the groove, comprising a frame, conveyor means supported by said frame for advancing the groove-bearing member along a path parallel to the groove, a bearing plate secured to said frame and extending laterally from said conveyor, a bearing mounted on said plate, said bearing being adjustable to change the angle of the bearing axis with respect to the direction of advance, a hammer fixed to the end of a shaft mounted in said bearing, and a source of power for reciprocating said shaft in said bearing to cause the hammer to strike said stripping, thereby seating the flange in the groove.

6. An apparatus for securing flanged flexible rubber-like weather stripping to a groove-bearing member, the stripping having one end of the flange thereon seated in the groove, comprising a frame, conveyor means supported by said frame for advancing the groove-bearing member along a path parallel to the groove including a driven belt and cooperating rollers for holding said member in contact with said belt, a reciprocatable hammer mounted on said frame adjacent said conveyor means in a bearing disposed at an acute angle to said groove and in the direction of advance, and a source of power for reciprocating said shaft in said bearing to cause the hammer to strike said stripping, thereby seating the flange in the groove.

7. An apparatus for securing flanged flexible rubber-like weather stripping to a groove-bearing member, the stripping having one end of the flange thereon seated in the groove, comprising a frame, a conveyor belt supported by said frame for advancing the groove-bearing member along a path parallel to the groove, a first set of longitudinally spaced rollers aligned along one side of the belt for engaging one side of the groove-bearing member, a bearing plate secured to said frame and extending laterally opposite said rollers, a bearing secured to said plate, a reciprocatable hammer mounted in said bearing disposed at an acute angle to said groove and in the direction of advance, a second set of rollers mounted above said belt and adapted to bear against the top surface of said groove-bearing member to keep it in firm contact with said belt, and a source of power for reciprocating said shaft in said bearing to cause the hammer to strike said stripping, thereby seating the flange in the groove.

8. The apparatus of claim 7 in which said second set of rollers are vertically adjustable to accommodate different sized groove-bearing members.

9. An apparatus for securing flanged flexible rubber-like weather stripping to a groove-bearing member, the stripping having one end of the flange thereon seated in the groove, comprising a frame, a conveyor belt supported by said frame for advancing the groove-bearing member along a path parallel to the groove, a first set of longitudinally spaced rollers aligned along one side of the belt for engaging one side of the groove-bearing member, a bearing plate secured to said frame and extending laterally opposite said rollers, a bearing secured to said plate, a reciprocatable hammer mounted in said bearing disposed at an acute angle to said groove and in the direction of advance, a second set of rollers mounted above said belt, and adapted to bear against the top surface of said groove-bearing member to keep it in firm contact with said belt, a third set of rollers opposite said first set for engaging the groove-containing side of said groove-bearing member to prevent lateral movement thereof, and a source of power for reciprocating said shaft in said bearing to cause the hammer to strike said stripping, thereby seating the flange in the groove.

10. The apparatus of claim 9 in which said second set of rollers are vertically adjustable and said third set of rollers are laterally adjustable to accommodate different sized groove-bearing members.

11. The apparatus of claim 5 in which the hammer is mounted for angular adjustment on the end of said shaft.

References Cited in the file of this patent

UNITED STATES PATENTS

| | | |
|---|---|---|
| 1,556,234 | Maise | Oct. 6, 1925 |
| 1,727,184 | Thompson | Sept. 3, 1929 |
| 2,304,976 | Watter | Dec. 15, 1942 |
| 2,343,043 | Brugman | Feb. 29, 1944 |
| 2,638,131 | Rohs | May 12, 1953 |
| 2,646,617 | Turoff | July 28, 1953 |
| 2,695,445 | Johnson | Nov. 30, 1954 |